US007975120B2

(12) United States Patent
Sabbatini, Jr. et al.

(10) Patent No.: US 7,975,120 B2
(45) Date of Patent: Jul. 5, 2011

(54) DYNAMIC ALLOCATION OF MESSAGE BUFFERS

(75) Inventors: Narcizo Sabbatini, Jr., Valinhos (BR); Antonio Mauricio Brochi, Campinas (BR)

(73) Assignee: Freescale Semiconductor, Inc., Austin, TX (US)

( * ) Notice: Subject to any disclaimer, the term of this patent is extended or adjusted under 35 U.S.C. 154(b) by 51 days.

(21) Appl. No.: 11/645,870

(22) Filed: Dec. 27, 2006

(65) Prior Publication Data
US 2008/0162860 A1    Jul. 3, 2008

(51) Int. Cl.
G06F 13/00    (2006.01)
G06F 13/28    (2006.01)
G06F 9/26    (2006.01)
G06F 9/34    (2006.01)

(52) U.S. Cl. ................ 711/170; 711/202; 711/E12.033
(58) Field of Classification Search ........................ None
See application file for complete search history.

(56) References Cited

U.S. PATENT DOCUMENTS

| | | | | |
|---|---|---|---|---|
| 5,420,999 | A | * | 5/1995 | Mundy ......................... 711/173 |
| 6,434,450 | B1 | * | 8/2002 | Griffin et al. ..................... 701/1 |
| 6,604,156 | B1 | * | 8/2003 | Slivkoff et al. ................ 710/57 |
| 6,715,001 | B1 | | 3/2004 | Birns et al. |
| 6,912,594 | B2 | | 6/2005 | Bartling |
| 6,996,070 | B2 | * | 2/2006 | Starr et al. ..................... 370/252 |
| 2003/0061547 | A1 | * | 3/2003 | Bartling ......................... 714/43 |

FOREIGN PATENT DOCUMENTS

| | | |
|---|---|---|
| EP | 0621 709 A1 | 3/1994 |
| WO | WO 2004/105328 A1 | 5/2004 |

OTHER PUBLICATIONS

PCT Search report and Written Opinion for corresponding PCT Application No. PCT/US07/83278 mailed Jul. 7, 2008.
Infineo Technologies, User's Maual MutiCAN, V1-0, Jun. 2005, TC1796 Peripheral Units (vol. 2 of 2) pp. 22-196 through 22-210.
Bosch; "CAN Specification, Version 2.0"; 1991.
Parlante; "Linked List Basics"; 2001.
EPC Application No. 07854550.6; Extended Search Report dated Aug. 30, 2010.

* cited by examiner

*Primary Examiner* — Reginald G Bragdon
*Assistant Examiner* — Eric S Cardwell

(57) ABSTRACT

A method for allocating memory that is associated with a CAN (controller area network) controller, comprises receiving a data frame comprising an identifier (ID) and data; dynamically allocating a message buffer (MB) within the memory for queuing the data frame; and generating a pointer that points to the MB, where the pointer is accessed via a static location in the memory. A corresponding host interface for the CAN controller can be implemented in IC circuitry, is configured to be coupled to a host CPU and a CAN bus interface, and includes a memory allocation unit for dynamic memory allocation and a memory access controller, coupled to the memory allocation unit and the memory, that is configured to control access to the memory to facilitate transmitting and receiving a multiplicity of data frames over a CAN bus.

20 Claims, 6 Drawing Sheets

DYNAMIC ALLOCATION OF MESSAGE BUFFERS

FIELD OF THE INVENTION

This invention relates in general to memory allocation and more specifically methods and apparatus for dynamic allocation of memory resources associated with CAN (Controller Area Network) protocol based devices.

BACKGROUND OF THE INVENTION

The Controller Area Network protocol is generally known and was originally developed in the 1980s for connecting control units in automotive environments. Presently CAN is used in many applications particularly where electrical interference may be present. Typically a CAN module or controller is deployed together with, e.g., can be included or embedded with a microcontroller, and a CAN bus (bus using CAN protocols) is used to facilitate communication between an assortment of such microcontrollers.

The CAN module normally includes a CAN engine that implements the specifics of the protocol and interfaces directly to the CAN bus. Further included is a Host interface that supports an interface with the host, e.g., the microcontroller, and buffers information or data that is being transferred between the microcontroller and the CAN engine.

Present approaches for the data buffering generally use either a mailbox or a FIFO (first in first out) model or approach. In the mailbox model, blocks of memory are allocated to store data and the data is stored according to an ID (Identifier) associated with the data and the destination can use or recall the data in any order. In the FIFO model, data is stored or queued and delivered to or read by the microcontroller or CAN engine (depending on direction) according to the order of arrival. Some CAN modules allow use of both schemes, however these modules are inefficient in terms of memory allocation since memory is dedicated to one of the approaches and thus is not available for the other.

Each of these approaches has problems. For example, it is difficult to assign and manage priorities, i.e., send high priority data before low priority data, using the FIFO approach. The mailbox model does not support data movement in any particular order and is susceptible to data loss, i.e., for a given mailbox allocation, later data may overwrite earlier data before the earlier data is read.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
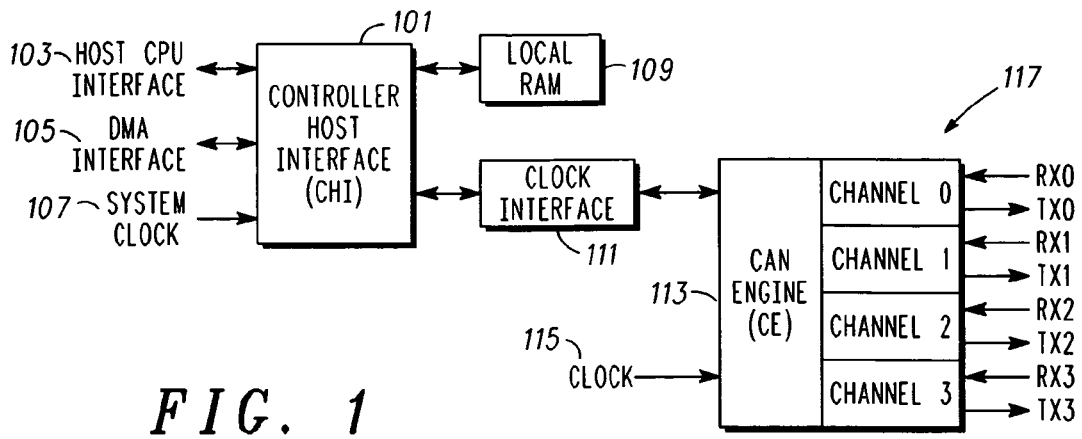
FIG. 1 depicts in a simplified and representative form, a high level diagram of a controller area network (CAN) controller in accordance with one or more embodiments.

In overview, the present disclosure concerns controller area network (CAN) controllers, and more specifically techniques and apparatus for dynamic memory allocation for memory associated with CAN controllers. More particularly various inventive concepts and principles embodied in methods and apparatus, e.g. integrated circuits or other hardware and processes therein, which are arranged and constructed for efficient and dynamic memory allocation only when and for so long as the memory is needed will be discussed and disclosed.

The embodiments of particular interest may vary widely but include CAN controllers embodied in hardware, e.g., state machines, that provide dynamic memory allocation in either a mailbox manner or a FIFO manner on an as needed basis without apriori allocation of such memory to any particular one of these approaches. In systems, equipment and devices that employ CAN controllers, e.g., those using CAN buses for communications between host controllers, the apparatus and methods described below can be utilized for efficient memory usage, provided they are practiced in accordance with the inventive concepts and principles as taught herein.

The instant disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in integrated circuits (ICs) including possibly application specific ICs, ICs with integrated processing controlled by embedded software or firmware, or ICs implementing one or more state machines. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts of the various embodiments.

Referring to FIG. 1, a simplified and representative high level diagram of a controller area network (CAN) controller in accordance with one or more embodiments will be briefly discussed and described. In FIG. 1, the CAN controller is arranged and configured to support the known CAN 2.0B protocol specification and includes a host interface 101 which facilitates a host microcontroller or host CPU interface 103 where this interface allows the host to read messages and supply messages from or to a CAN bus. The host interface also supports a direct memory access (DMA) interface 105 wherein various peripheral hosts or controllers have direct read write access to memory via the host interface 101. The host interface 101 is clocked from the system clock 107. The host interface controls and facilitates access to a memory 109, e.g., a portion of a local random access memory (RAM) where other portions of the RAM may be used by the host device for other purposes. The CAN controller can include a clock interface 111 that allows the host interface 101 to operate or be clocked from a system clock 107 and still interface with a CAN engine 113 that is clocked from a separate and asynchronous clock 115. The CAN engine 113 is included with the CAN controller and can support up to four channels 117 or CAN buses, each operating at different communication rates and all in accordance with the known CAN 2.0B protocol specification.

Figure 2:
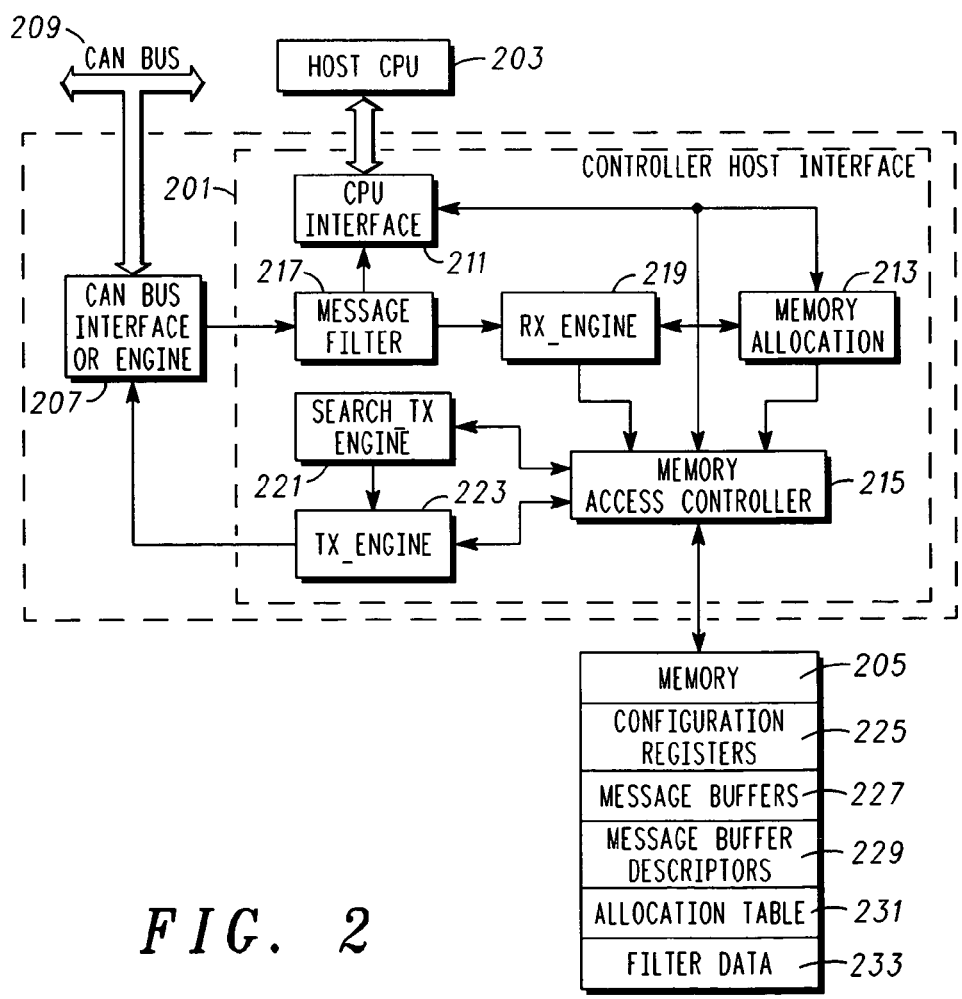
FIG. 2 in a representative form, shows a diagram of a host interface suitable for use in the CAN controller of FIG. 1 in accordance with one or more embodiments.

Referring to FIG. 2, a representative and more detailed diagram of a host interface 201 suitable for use in the CAN controller of FIG. 1 in accordance with one or more embodiments will be briefly discussed and described. FIG. 2 shows the host interface 201 coupled to or interfaced with a host or host CPU 203 and a memory 205 or RAM as well as a CAN engine 207, where the CAN engine interfaces to a CAN bus 209 (only one bus shown). Generally the host 203, e.g., a microcontroller or other device with communication requirements via the CAN bus, can send messages or data frames over the CAN bus or receive messages or data frames from the CAN bus and thus exchange data with other such devices via the CAN bus. More specifically when the host 203 wants to send data, the data is queued as a message or data frame in the RAM 205 until transmission via the CAN engine 207 and CAN bus 209 is possible. Similarly when messages or data frames are received from the CAN bus by the CAN engine, these messages or data frames are queued in the RAM. It will be appreciated that sending/transmitting data and receiving/reading data can be undertaken essentially concurrently and that a plurality of devices (one or more CAN channels, hosts, etc.) may require more or less concurrent access to the RAM. To eliminate any resulting contention issues or possible problems resulting there from, the processes associated with the queuing of data frames (RAM access, reading, writing, etc.) including dynamic memory allocation are handled or facilitated by the host interface 201.

The host interface 201 includes a CPU interface 211 that is coupled to the host 203 (including other devices with DMA capability. The CPU interface 211 handles all physical and logical requirements for this interface and includes one or more data buses as well as logical communication links, e.g., interrupt lines, etc. The CPU interface is coupled to a memory allocation unit 213 as well as a memory access controller 215. The memory allocation unit and memory access controller collectively dynamically allocate or facilitate dynamic allocation as well as control access by the host 203 and CAN engine 207 to the memory 205. When the host has one or more messages or data frames for transmission via one of the CAN buses the memory allocation unit allocates or facilitates allocation of memory for queuing the messages and the memory access controller controls access to the memory so that the host can write the message to the memory as will be further discussed below.

Additionally and optionally included in the host interface 201 is one or more message filter units 217, which are coupled to the CAN engine 207 and operate to filter messages or data frames as they are received from one of the CAN buses. The filtering processes amounts to testing incoming messages for various criteria, e.g., message identifier (ID) characteristics, a time stamp value, content characteristics, CAN channel ID, etc. When a message matches a predetermined set of filter criteria as determined by the filtering units, an interrupt can be sent to the host via the CPU interface 211. The message filter units 217 are coupled to a receive engine 219, which supports the reception of messages and storing or queuing these messages in the memory 205. The storing or queuing is supported via the communication link from the receive engine 219 to the memory allocation unit 213 and memory access controller 215. When a message is being received the receive engine 219 requests allocation of memory by the memory allocation unit 213 and then obtains access for writing the message to memory from the memory access controller 215 as will be further discussed below. Further included are functions that operate to facilitate transmission of messages or data frames via a CAN bus. One of these functions is a transmit search unit 221 that is coupled between the memory access controller 215 and a transmit engine 223. The transmit search unit 221 searches messages that are stored in the memory 205 for message or data frame ID characteristics so that the order of transmission of such messages can be prioritized. In one or more embodiments, the data frame or message IDs are searched for the smallest ID and that message is prioritized for the next available transmit slot on the relevant bus. The transmit engine 223 is coupled to the search unit 221 and the memory access controller 215 and functions to read the message or data frame contents (message identified by the search engine) and forward these contents to the CAN engine.

The memory 205, e.g., a portion of local RAM or similar memory includes various portions or segments that are used for different purposes. For example, a portion of the memory is devoted to configuration registers 225. Some configuration registers or portions thereof are loaded by the host 203 while the CAN controller is in a configuration or initialization mode and used to set various operational characteristics of the CAN controller including CAN engine, etc. The configuration registers in some embodiments can include a global configuration register which contains data that control the operating mode of the CAN controller, whether interrupts are generated on receive and transmit occurrences as well as various other operating characteristics, e.g., clock source for CAN engine, order of transmission, interrupts or flags for memory overflow, low memory, etc., or thresholds for low memory, etc. Further included can be, a protocol configuration, a free running timer, error counting, and error and status register for each CAN channel. These registers establish protocol operating variables, provide a timer for time stamps, count errors for transmissions and receptions, and keep track of various types of errors and set operating conventions when these errors occur on a per channel basis.

Other registers in various embodiments include a receive and a transmit interrupt register that provides support for interrupt driven access to various memory locations and buffers during the reception and transmission process. One or more embodiments also include an access register, which facilitates memory allocation by providing the host 203, etc. indirect access to various flags (read, set, reset, etc) without directly accessing memory. Using the access register and thus indirect memory access avoids data coherence issues that could result from direct memory access by multiple entities. For example, one bit in the access register is a Message buffer allocation bit that can be set by the host to request memory allocation while another bit is an acknowledgement that the allocation has occurred. Access pointers to the allocated memory (message buffer (MB), which is one of possibly several message buffers 227) and to a corresponding MB descriptor (one of several MB descriptors 229), can also be included in the access register. The MB descriptor includes a message pointer to the corresponding message buffer and this message buffer may include a further message pointer to a further message buffer. The memory 205 also includes an allocation table 231 where each bit in the table is used to signify whether an area in memory is available for allocation. The memory 205 also includes filter data 233 where information used by the message filter units 217 is stored. Note that the various registers, allocation table and filter data are in static or predetermined locations in the memory 205 whereas the message buffers 227 are each dynamically allocated only when and for so long as needed. which are included in an allocation table 231)

The host interface 201 in some embodiments can support memory that may be wider than a host can directly address. For example, in some embodiments, the host interface supports 72 bit wide memory and is still suitable to be used with a host that is restricted to 8, 16, or 32 bit accesses. For example, this can be accomplished using a shadow memory arrangement wherein one or more tag memories are associated with a main memory and located at a corresponding one or more fixed or predetermined locations relative to the main memory location. Data that does not fit in the main memory can be stored at the corresponding tag memory locations.

In more detail the message buffers 227 in various embodiments are memory objects that are dynamically allocated as needed and configured to store 16 bytes; including up to 8 bytes of data, a time stamp (from free running timer or a programmed value), a message pointer (8 bits) to a next MB if needed, length of data in bytes (1-8), CAN channel identifier, Standard or extended flag, and frame identifier (ID), which contains the ID of received frames or frames to be transmitted and can be in standard or extended form (dependent on flag), e.g., 11 most significant bits or 28 bits. The message buffers are allocated, configured and controlled by configuration objects denoted as MB descriptors. The MB descriptors are in a predetermined memory location and include a pointer to the associated MB. The MB descriptors are initialized by the host in an initialization mode of operation for the host interface. Note that each MB may include a pointer to a further MB and thus a linked list of MBs can be formed. The linked list of MBs is useful for handling reception of data frames when the host or other entity is slow at reading the stored data or for staging a list of frames for transmission. The MB descriptor in various embodiments includes a descriptor type field (receive, receive and transmit, transmit, or none), a first and second pointer and corresponding first and second flags, interrupt enable flag, DMA enable flag, and a last descriptor field which indicates the last MB descriptor that is configured. These processes and use of the various fields will be discussed in further detail below.

The filter data 233 includes one or more receive filters which are 8 byte data structures that are allocated in local volatile memory and which specify filter criteria for accepting/rejecting incoming data frames. Two or more receive filters can be grouped together to form a filter group. The receive filters are configured by the host during the initialization mode of operation for the host interface. The filters can reject or accept data frames with particular IDs or a range of IDs, data frames from a particular CAN channel, or data frames with certain content. In various embodiments, each MB descriptor has an associated receive filter and thus at least one receive filter must be configured at initialization.

Thus in various embodiments and as will be further discussed herein below, the CAN controller of FIG. 2 includes a memory allocation unit 213 that can be implemented as an integrated circuit and is configured to dynamically allocate one or more message buffers (MB) within a memory 205, where the MB is for queuing, upon reception, a data frame comprising an identifier (ID) and data and to provide a pointer that points to the MB, where the pointer is accessed via a static location (MB descriptor) in the memory. Further included is a memory access controller that is coupled to the memory allocation unit and the memory and that is configured to control access to the memory to facilitate transmitting and receiving a multiplicity of data frames over a CAN bus. In various embodiments the CAN controller further comprises a receive engine 219 for receiving the data frame comprising an identifier (ID) and data and for causing the memory allocation unit to dynamically allocate the MB and assign the static location in the memory.

In some embodiments the CAN controller includes a message filtering unit 217 that is coupled to the CAN bus and configured for filtering data frames as received in accordance with filtering criteria, wherein assigning the static location and dynamically allocating the MB is responsive to the data frame satisfying the filtering criteria. The receive engine in some embodiments and in operation receives a plurality of data frames and the memory allocation unit dynamically allocates a corresponding plurality of MBs with the pointer placed in the static location in memory and a next pointer placed in the MB and pointing to a next allocated MB, thereby building a linked list of MBs in the order that the plurality of data frames was received. The message filtering unit is coupled to the CAN bus and configured for filtering the plurality of data frames in accordance with different filtering criteria, e.g., a first filtering criteria and in accordance with a second filtering criteria, where a first linked list of MBs is formed from a first portion of the plurality of data frames that satisfy the first filtering criteria and a second linked list of MBs is formed from a second portion of the plurality of data frames that satisfy the second filtering criteria.

The CAN controller further includes a CPU interface 211 that is configured to be coupled to a host CPU 203 and is coupled to the memory access controller and memory allocation unit and collectively configured to provide the host with read access to the MB via the pointer wherein after the MB has been read by the host it is de-allocated by the memory allocation unit, thereby allowing reuse of the memory associated with the MB. The host can be provided access to a MB or one or more linked lists of MBs in various modes of operation including a polling mode, an interrupt driven mode and a DMA mode of operation.

In summary, the host interface is part of a CAN controller that facilitates an interface between a CAN engine and multiple CAN channels and a host as well as an interface between each and a local memory for temporary storage of data frames. In addition to storage for data frames which is dynamically allocated only when needed, the memory is used for various configuration registers and data structures that are used to configure and control the reception and transmission processes.

Figure 3:
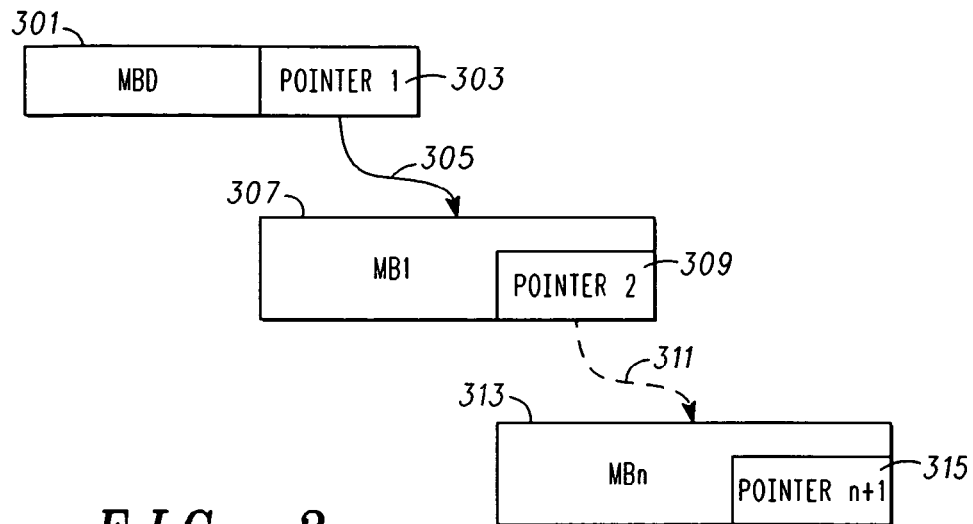
FIG. 3 is a representative diagram that illustrates one aspect of dynamic allocation of memory in accordance with one or more embodiments.

Referring to FIG. 3, a representative diagram that illustrates one general aspect of dynamic allocation of memory associated with a CAN controller in accordance with one or more embodiments will be discussed and described. FIG. 3 shows a linked list of memory buffers (MBs) and it will be appreciated that the host interface or CAN controller can maintain one or many such lists. Generally the linked list of MBs can include MBs that are linked together for reasons, such as received data frames that passed the same filtering criteria and have been stored in typically the order received or possibly data frames that have been grouped together by the host and queued for transmission. The linked list of MBs may be viewed as a generalization of the mailbox and FIFO queuing models, i.e., a list with one MB can be regarded as a mailbox while a linked list with a plurality of MBs can be considered as a FIFO queue. Generally a data frame comprising an identifier (ID) and data is received or made available. At that point a message buffer is dynamically allocated for use in queuing the data frame and a pointer is generated which points to the MB that was allocated in a manner that allows access to the pointer via a static or predetermined location in the memory. With reference to FIG. 3, when an initial data frame is received the message buffer MB1 307 is allocated, a MB descriptor 301 (at a fixed or predetermined location in memory) is assigned to MB1 and pointer 1 303 (which points 305 to MB1) is written to the MB descriptor 301. Pointer 2 309 is stored as a predetermined value, e.g., all zeros, if MB1 is the last MB in the linked list. As additional data frames that are grouped together are received additional MBs, i.e., MB2 (not shown)-MBn 313 are sequentially allocated and pointer 2 309 (pointing 311 to MB2) is written to MB1, etc. until the last data frame is received and last MB, i.e., MBn 313 is allocated. Pointer n+1 will be written with the predetermined value, e.g., all zeros denoting the end of the linked list of MBs.

Thus the generating the pointer can comprise placing the pointer in the static location in memory, e.g., the MB descriptor when the associated MB is the first member of a linked list. Alternatively generating the pointer further comprises placing the pointer in an earlier MB that was allocated for queuing an earlier data frame, where a pointer that points the earlier MB is placed in the static location in memory, e.g., the MB descriptor.

The host interface maintains the memory allocation table 231. When a new frame is received, the table is searched to find a free memory block, which is marked as used (corresponding flag in table is set) and the pointer to this memory block is made available to be written into the MB descriptor (if the MB is the first member of the linked list) or the previous MB. Note that various embodiments only write the pointer after the successful reception of a data frame and otherwise the MB is discarded and the table is cleared. In a transmission process the host CPU 203 requests allocation of a memory block or MB by writing "1" to the MB allocation bit or flag in the access register (DAR). The host interface searches the allocation table, allocates a MB and marks the table, and writes the pointer to the newly allocated MB in either the MB descriptor (for a first MB) or the previous MB on the list. When a linked list of data frames has been consumed (read by the host if a received list or transmitted if a transmit list) the entire list of MBs is de-allocated from memory and corresponding flags in the allocation table are cleared, and pointers in the MB descriptor are erased or set to zero thereby allowing reuse of the memory associated with the MBs.

In general receiving data frames (from a CAN channel or from a host) can comprise receiving over time a plurality of data frames and dynamically allocating a corresponding plurality of MBs and generating or providing a corresponding plurality of pointers where a first pointer for a first data frame is included within a second MB for a second data frame, whereby the plurality of pointers provide a linked list of the MBs corresponding to the plurality of data frames. In one or more embodiments generating the pointer comprises locating or storing the pointer in the static location, e.g., MB descriptor, and this pointer points to an earliest allocated MB. In alternative embodiments, the pointer can be located in the static location in memory and point to a most recently allocated MB. In this alternative embodiment, the earliest allocated MB would be at the end of the linked list and the last or most recently allocated MB would be pointed to by the pointer in the MB descriptor and include a pointer to the next most recently allocated MB, etc.

Figure 4:
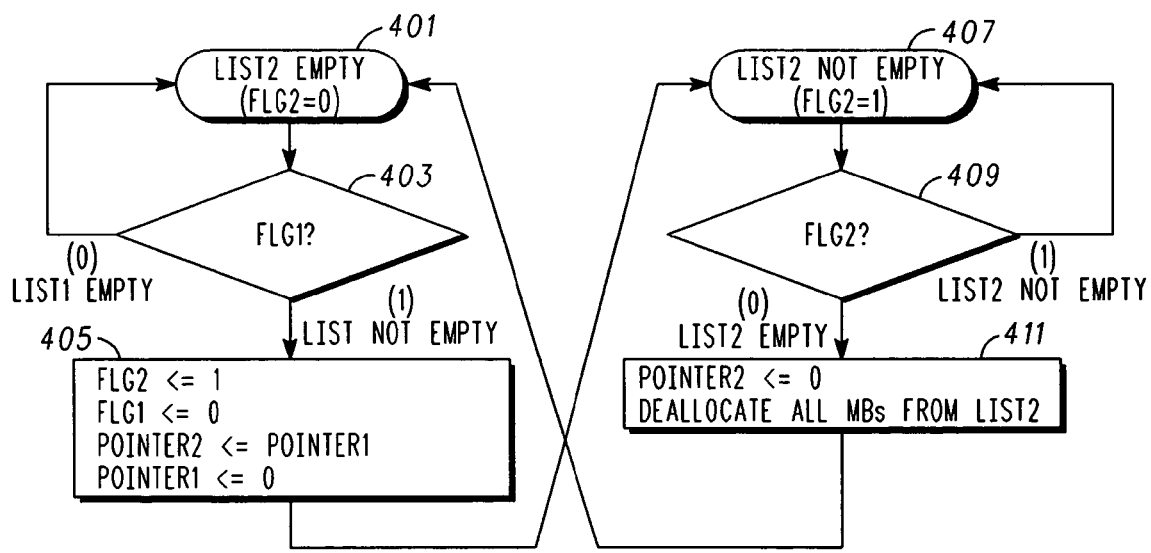
FIG. 4 depicts a representative high level flow chart illustrating a buffering aspect of the host interface of FIG. 2 in accordance with one or more embodiments.

Referring to FIG. 4, a representative high level flow chart illustrating a buffering aspect of the host interface of FIG. 2 in accordance with one or more embodiments will be discussed and described. As noted above a MB descriptor can include two pointer fields (POINTER1 and POINTER2) which are arranged to address two linked lists of MB concurrently. The MB descriptor also includes two flags (FLG1 and FLG2) associated with the corresponding pointer and reflecting the state of the corresponding MB list, empty or not. The two pointers and flags are used in both reception and transmission processes to provide a double buffering interface between the host or other DMA entity 203 and the host interface 201. Essentially the host 203 and the host interface will not be accessing the same linked list at the same time. When receiving data frames from a CAN channel and reading those frames at the host, the host interface stores received frames in the list addressed by POINTER1 (List1) while the host or DMA entity reads previously received and stored frames from the list addressed by POINTER2 (List2). When transmitting data frames, the host accesses List1 for queuing data frames, while the host interface accesses List 2 for transmitting previously queued data frames. Thus the entity that is causing data frames to be queued accesses List1 and the entity that is consuming the data frames accesses List2.

At 401 List2 is empty (FLG2=0). FLG1 is checked 403 and if "0" List1 is empty and if "1" List1 is not empty. At 405 FLG2 is set to 1 and FLG1 is set to 0, while POINTER2 takes on the value of POINTER1 and POINTER1 is set to 0. List2 (old List1) is no longer empty (FLG2=1) 407 and the consuming entity accesses that list until FLG2 is "0" (List2 is empty) 409. Once the list is empty POINTER2 is set 0 and all MBs from List2 are de-allocated 411. Thus the queuing entity is able to access List1 for queuing data frames, while the consuming entity is accessing List2 and thereby avoid any conflicts or contention issues that may otherwise result.

Figure 5:
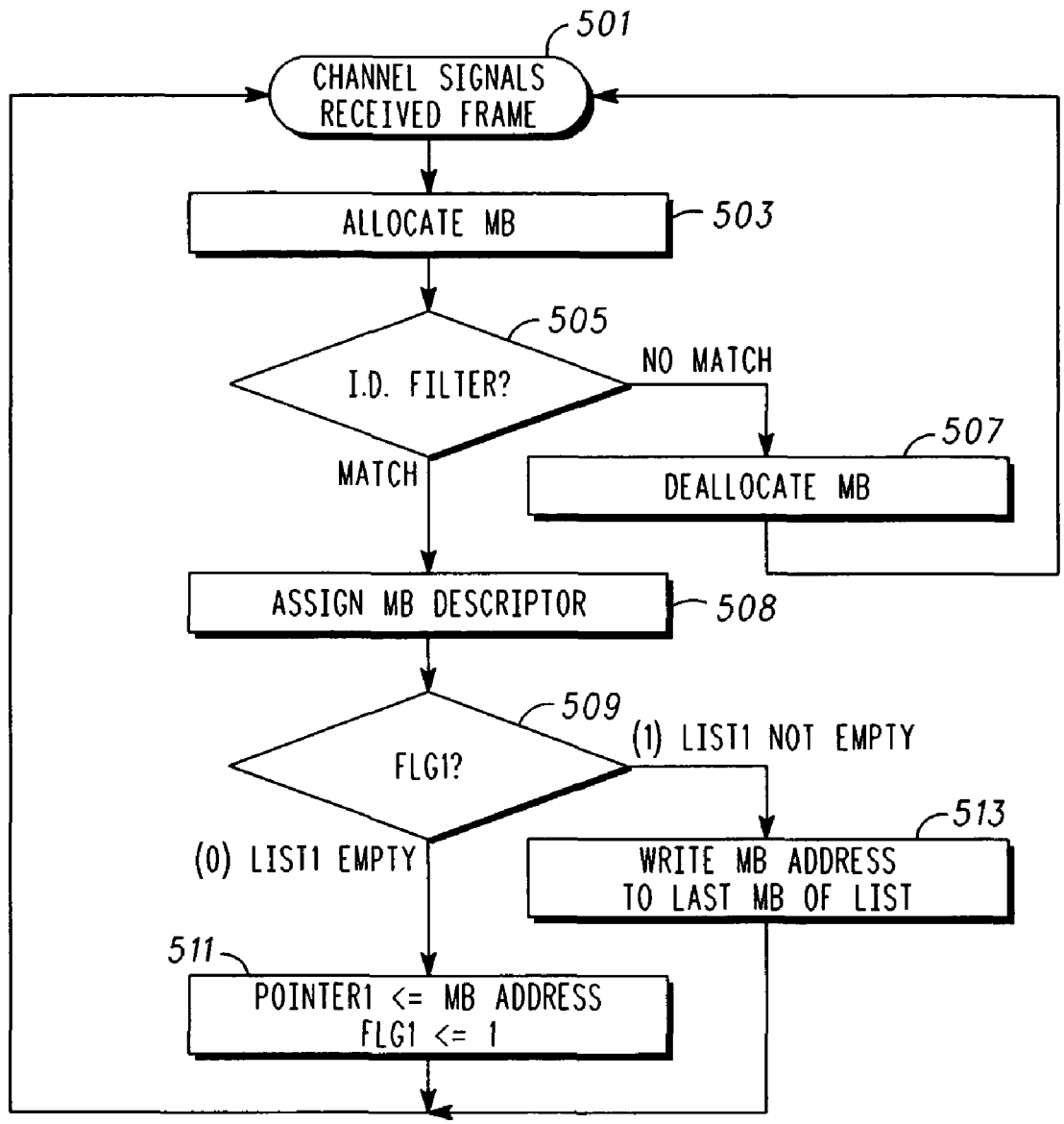
FIG. 5 depicts a flow chart that illustrates operation of the host interface when receiving CAN messages from a CAN bus in accordance with one or more embodiments.

Referring to FIG. 5, a flow chart that illustrates operation of the host interface 201 when receiving CAN messages from a CAN bus in accordance with one or more embodiments will be discussed and described. AT 501 a CAN channel (CAN bus interface 207) signals that a data frame has been received. In one or more embodiments, a message buffer is dynamically allocated by the host interface 503, i.e., memory allocation unit 213 and memory access controller 215. The data frame is written to this MB. The data frame is filtered (message filter unit filters the data frame in accordance with one or more of a data frame identifier, CAN channel, data content, time stamp, or other filter indicia) in accordance with filtering criteria from the associated filter table 505. If there is no match the MB is de-allocated 507.

Thus in various embodiments, the dynamically allocating a MB and generating a pointer are responsive to the data frame satisfying the filtering criteria. When the host interface is filtering a plurality of data frames in accordance with different filtering criteria, different linked lists of MBs can be formed from those data frames that satisfy different filtering criteria. For example, when filtering a plurality of data frames in accordance with a first filtering criteria and in accordance with a second filtering criteria, a first linked list of MBs can be formed from a first portion of the plurality of data frames that satisfy the first filtering criteria and a second linked list of MBs can be formed from a second portion of the plurality of data frames that satisfy the second filtering criteria.

If there is a match a MB descriptor is assigned to the MB 508 via the memory allocation unit 213 and memory access controller 215. Then FLG1 is checked by the memory access controller 509. If List1 is not empty the MB address or pointer to the just allocated MB is appended to the most recent MB in the list 513. If List1 is empty, the MB address or pointer to the just allocated MB is loaded into POINTER1 of the MB descriptor and FLG1 is set to 1 511. The process continues at 501 for additional received data frames.

Figure 6:
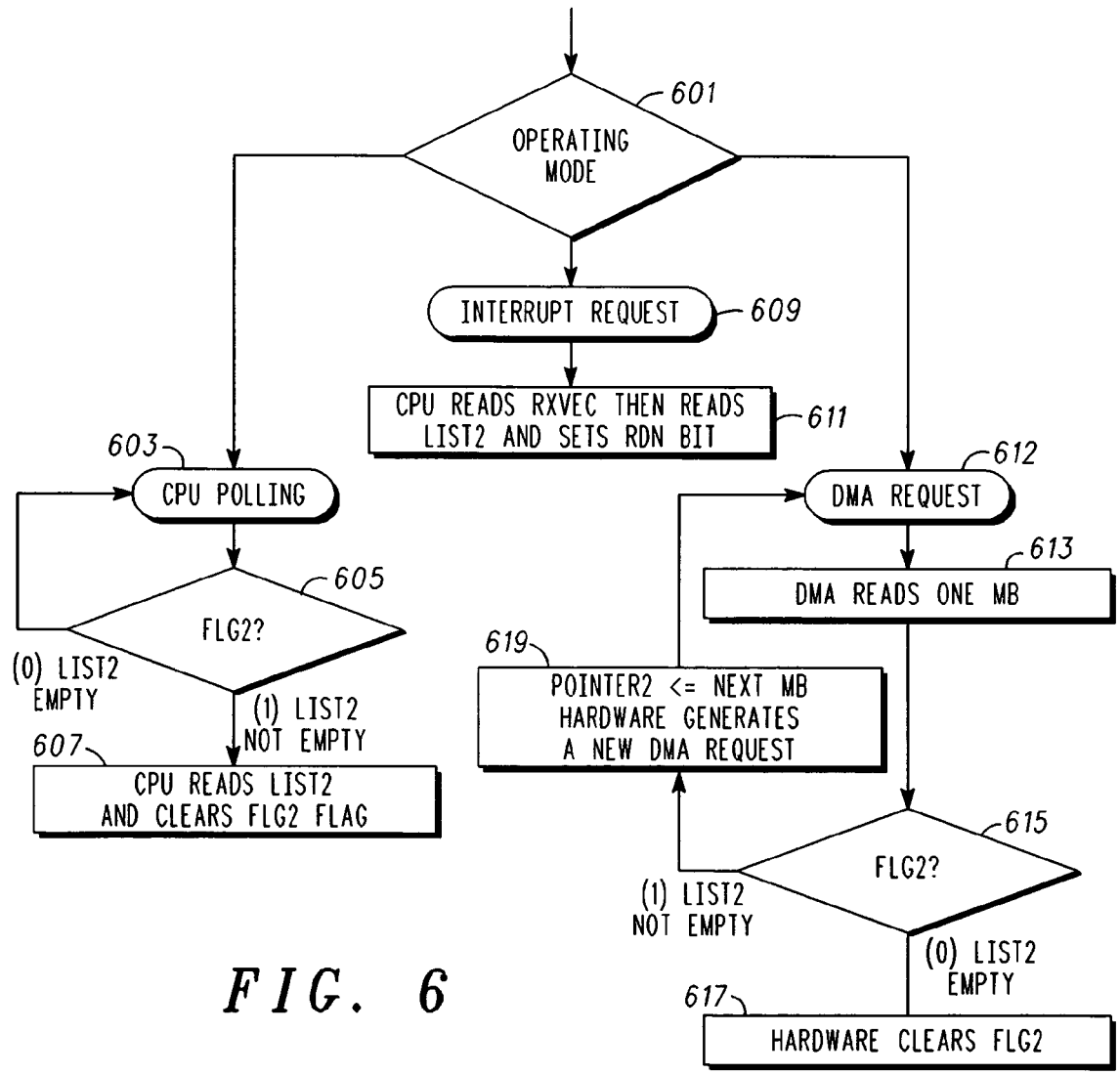
FIG. 6 depicts flow charts that illustrates operation of the host interface from a host perspective while reading CAN messages in accordance with one or more embodiments.

Referring to FIG. 6, flow charts that illustrate operation of the host interface from a host perspective while reading CAN messages in accordance with one or more embodiments will be discussed and described. The process depends on the operating mode of the host CPU 201 as reflected at 601. If the CPU or host is polling the host interface via the CPU interface 211 and memory access controller 215, for each MB descriptor that is being polled, first FLG2 is checked 605. If this indicates List2 is empty (0) polling continues. If List2 is not empty, i.e., data frames are available in the list, the host CPU is provided access to the respective MBs via the memory access controller 215 and the MB descriptor POINTER2, reads List2 and FLG2 is then cleared. If the host is operating in an interrupt driven mode an interrupt request is received 609 indicating that at least one data frame is available. The receive interrupt register will contain information about MB descriptors of type reception that have an interrupt flag as well as FLG2 set. A receive vector in the interrupt register will contain the address of the first MB of List2. After reading List2, the host sets a flag (RDN bit) in the interrupt register to instruct the host interface (memory access controller and memory allocation unit) to clear FLG2 and de-allocate all MBs in List2 611.

If the operating mode is DMA and if MB descriptors have been configured to operate in a DMA mode, a DMA request is generated for each MB of the list 612. The DMA transaction reads one MB 613, this MB is de-allocated, and FLG2 is checked. If List2 is not empty POINTER2 is set to the next MB and the host interface generates a new DMA request 619. Once List2 is empty (FLG2=0). The host interface clears FLG2 finishing all DMA requests for this list 617.

Figure 7:
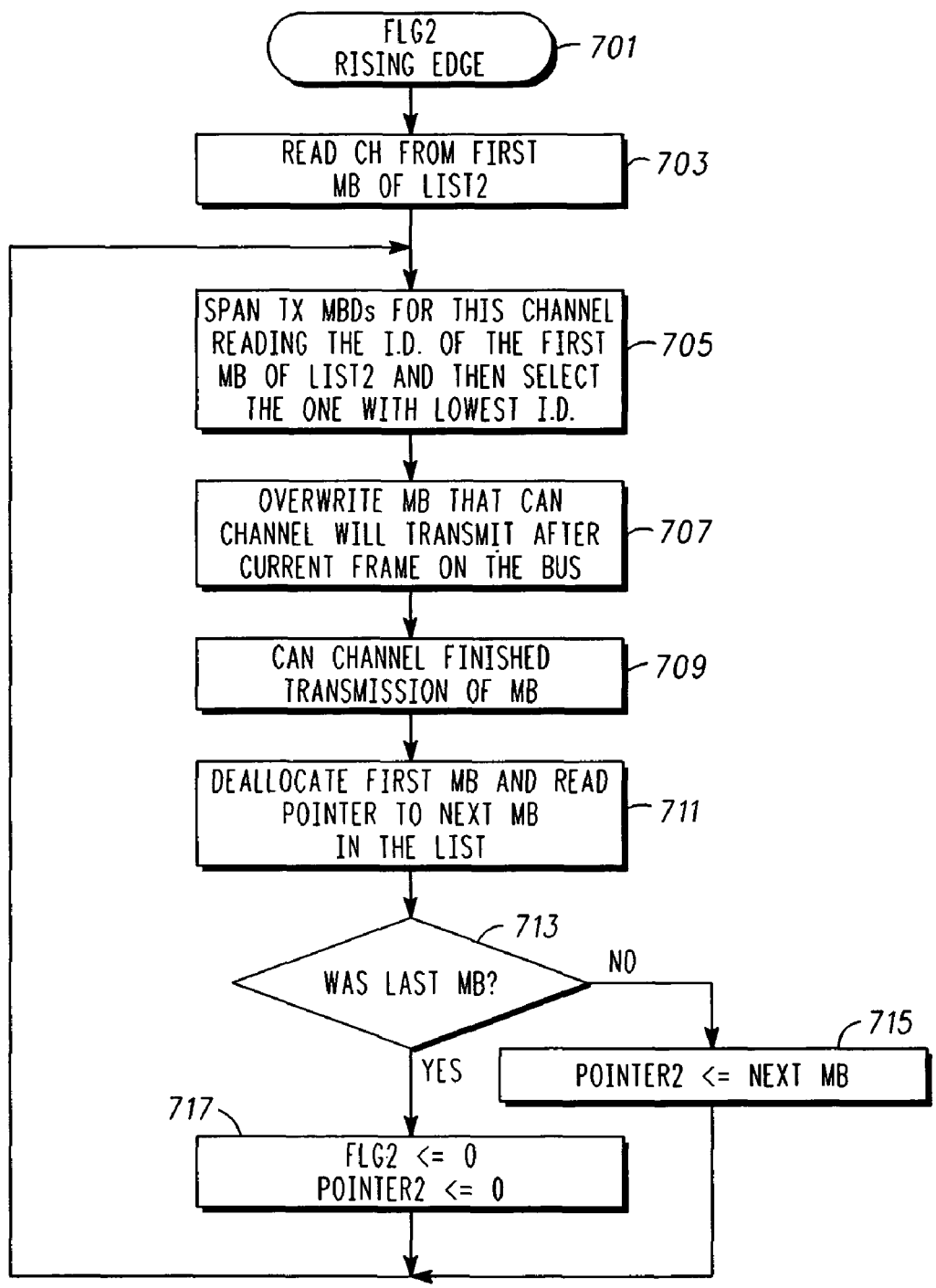
FIG. 7 depicts a flow chart that illustrates operation of the host interface during transmission on the CAN bus in accordance with one or more embodiments.

Referring to FIG. 7, a flow chart that illustrates operation of the host interface during transmission on a CAN bus in accordance with one or more embodiments will be discussed and described. This may be viewed as an arbitration process as the host interface 201 operates to insure that each channel will transmit the highest priority data frame, e.g., lowest ID, lowest time stamp, or other indicia of priority, that is available when transmission is initiated. The transmission or arbitration process can be initiated by various events including one or more new MBS or linked list of MBs with corresponding MB descriptors of type transmission becoming available for transmission (signaled by a transition of FLG2) or completion of a transmission of a previously scheduled MB. As depicted, each iteration of the process is restricted to one CAN channel and it will be appreciated that the host interface may concurrently be executing the process for other channels.

When a transition of FLG2 for one of the MB descriptors is detected 701, the CAN channel ID is read from the first MB within List2 703. Then the MB descriptors with type transmission are prioritized using the transmit search engine 221 by spanning all such MB descriptors for this channel and reading appropriate prioritization information from the first MB in each respective List2 705. The highest prioritized MB, e.g., the one with the lowest ID, is selected for transmission and the selected MB is queued for transmission after any current activity on the Bus or CAN channel 707. When the CAN channel is finished transmitting the MB 709, this MB is de-allocated and the pointer to the next MB in the list is read by the host interface 711. At 713 it is determined whether the de-allocated MB was the last MB (pointer to next MB is all zero, etc.). If not, POINTER2 is set to the next MB in the list of MBs 715 and if so FLG2 and POINTER2 for the present MB descriptor (linked list of MBs) are cleared 717 and the process continues to 705 for additional linked lists corresponding to the current or target channel. Another FLG2 indication will restart the process from 701. It will be appreciated that the host interface is handling or facilitating the memory access and memory allocation functions and this interface may be embodied in an integrated circuit form as earlier noted.

Figure 8:
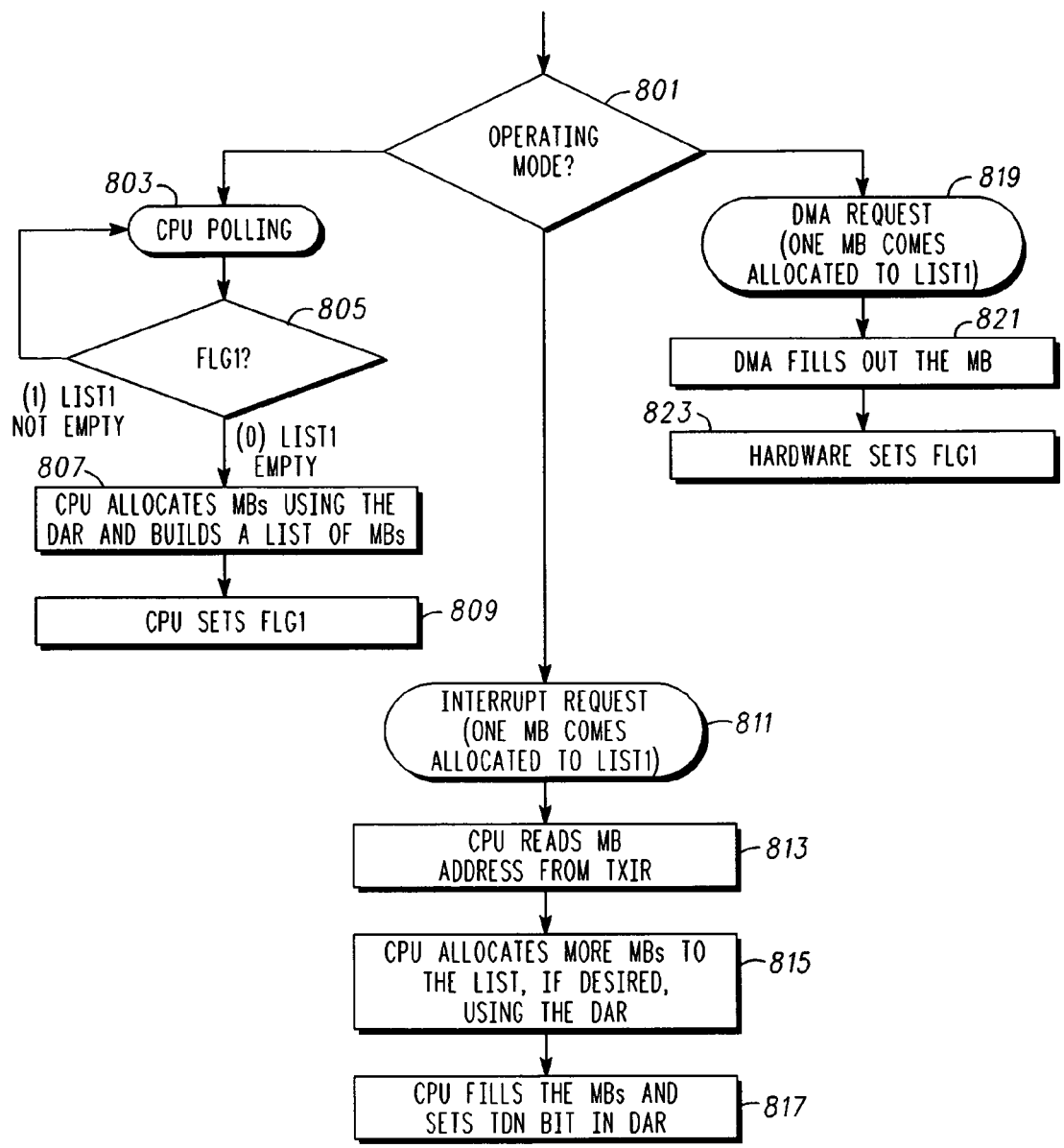
FIG. 8 shows a flow chart that illustrates operation of the host interface from a host perspective while transferring CAN messages for transmission on the CAN bus in accordance with one or more embodiments.

Referring to FIG. 8, a flow chart that illustrates operation of the host interface from a host perspective while transferring CAN messages for transmission on the CAN bus in accordance with one or more embodiments will be discussed and described. Different processes are used depending on the operating mode of the host CPU 203 or other DMA entity as determined at 801. If the host is working in a polling mode, it will poll the MB descriptors of type transmission and check the respective FLG1 805. If LIST1 is not empty (FLG1 is 1) polling continues. If LIST1 is empty (FLG1 is 0), the CPU requests allocation of a MB using the descriptor access register (DAR) and builds a linked list of MBs 807. The host can clear FLG1 to 0, thus holding List1 stable if MB and corresponding data frames are added to the list. With an MB allocated, the host can write data and ID information, etc. to the MB. Once the list of MBs has been constructed, the host CPU sets FLG1 to 1 using the DAR 809 thus enabling transmission of the resultant list.

If the host is operating in an interrupt mode, it will receive an interrupt indicating that at least one MB descriptor of transmission type has its List1 empty 811. The transmit interrupt register will include information about the first MB descriptor, e.g., in ascending order of descriptors, that has the interrupt flag as well as FLG1 cleared. The interrupt register will include a vector (address) of an already allocated MB that is available to be written by the host. The host will clear the interrupt flag in the interrupt register and read the vector to the allocated MB 813. If additional data frames need to be added to the list, the host CPU requests additional MBs be allocated using the DAR 815. The host writes the respective data frames to the allocated MBs and sets a flag in the DAR indicating that the list is ready for transmission 817. The host interface automatically sets FLG1 committing the list to transmission.

If the host is operating in a DMA mode and a MB descriptor has been programmed for DMA operation, a DMA request will be generated when the corresponding List1 becomes empty 819. A pre-allocated MB will be available to receive the DMA transfer of a data frame 821. When the DMA transaction is finished, the FLG1 bit is automatically set by the host interface and this enables transmission of that MB 823. If more than one MB descriptor can generate a DMA request the priority is according to the MB descriptor order, e.g., ascending order.

In the above discussions a CAN controller has been described. This includes a host interface 201 for a controller area network (CAN) controller, where the host interface can be implemented in integrated circuit (IC) circuitry and is configured to be coupled to a host 203 and to a CAN Bus interface 207. The host interface in various embodiments can include a memory allocation unit 213, implemented, e.g., as a hardware based state machine, for dynamically allocating message buffers (MBs) for queuing data frames in one or more linked list of MBs wherein for each linked list of MBs a first pointer to a first MB is stored in a predetermined memory location, a second pointer to a second MB is stored in the first MB, and subsequent pointers to subsequent MBs are stored in the respective immediately preceding MBs. Further included is a receive engine 219 coupled to the CAN bus interface for receiving data frames from the CAN bus and storing received data frames in the one or more linked list of MBs of type receive and a transmit engine 223 coupled to the CAN bus interface for transmitting transmit data frames stored in the one or more linked list of MBs of type transmit and a memory access controller 215, implemented, e.g., as a hardware based state machine, for controlling access by the receive engine, transmit engine, and the host to the one or more linked list of MBs. The host interface in some embodiments further comprises a message filter unit 217 that is coupled to the CAN bus interface and the receive engine for filtering received data frames in accordance with filtering criteria, wherein the received data frames that satisfy a first filtering criteria are stored in a first linked list of MBs and the received data frames that satisfy a second filtering criteria are stored in a second linked list of MBs. MBs that are consumed via a host reading operation or a transmitting operation are de-allocated and made available for queuing of other data frames.

It will be appreciated that the above described functions and structures may be implemented in one or more integrated circuits. For example, many or all of the functions can be implemented in the host interface functions as integrated circuitry that is suggested by FIG. 2 or other similarly configured and arranged structures. It will be appreciated that the above discussed methods use many of the inventive concepts and principles described with reference to FIGS. 1 and 2 and various details are generally available in the earlier descriptions.

The processes, apparatus, and systems, discussed above, and the inventive principles thereof are intended to and can alleviate problems of undue memory usage or data loss when memory is overwritten prior to consumption that are caused by prior art techniques. Using these principles of dynamic allocation of MBs only when and for so long as needed using, e.g., hardware based structures, can yield efficient memory utilization with relatively minimal costs and without the necessity for large available memories or the like.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for allocating memory that is associated with a CAN (controller area network) controller, the method comprising:
   receiving a data frame comprising an identifier (ID) and data;
   dynamically allocating a message buffer (MB) within the memory for queuing the data frame, wherein the MB is allocated only upon receiving the data and the MB is de-allocated once the data is retrieved from the memory;
   generating a pointer that points to the MB, where the pointer is accessed via a static location in the memory, and
   providing a host access to the MB in one or more of a polling mode of operation and an interrupt driven mode of operation.

2. The method for allocating memory of claim 1 wherein the generating the pointer further comprises placing the pointer in the static location in the memory.

3. The method for allocating memory of claim 1 wherein the generating the pointer further comprises placing the pointer in an earlier MB that was allocated for queuing an earlier data frame, wherein an earlier pointer that points to the earlier MB is placed in the static location in the memory.

4. The method for allocating memory of claim 1 further comprising de-allocating the MB and erasing the pointer when the data has been retrieved from the memory, thereby allowing reuse of the memory associated with the MB.

5. The method for allocating memory of claim 1 wherein:
   the receiving a data frame further comprises receiving over time a plurality of data frames;
   the dynamically allocating a message buffer (MB) further comprises dynamically allocating a corresponding plurality of message buffers (MBs); and
   the generating the pointer that points to the MB further comprises generating a corresponding plurality of pointers, where a first pointer for a first data frame is included within a second MB for a second data frame, whereby the plurality of pointers provide a linked list of the MBs corresponding to the plurality of data frames.

6. The method for allocating memory of claim 5 where the generating the pointer further comprises locating the pointer in the static location in the memory and where the pointer points to an earliest allocated MB.

7. The method of allocating memory of claim 5 where the generating the pointer further comprises locating the pointer in the static location in the memory and where the pointer points to a most recently allocated MB.

8. The method for allocating memory of claim 1 further comprising filtering the data frame in accordance with filtering criteria and wherein the dynamically allocating a MB and the generating a pointer are responsive to the data frame satisfying the filtering criteria.

9. The method for allocating memory of claim 8 where the filtering the data frame further comprises filtering a plurality of data frames in accordance with a first filtering criteria and in accordance with a second filtering criteria and where a first linked list of MBs is formed from a first portion of the plurality of data frames that satisfy the first filtering criteria and a second linked list of MBs is formed from a second portion of the plurality of data frames that satisfy the second filtering criteria.

10. The method for allocating memory of claim 8 where the filtering the data frame in accordance with filtering criteria further comprises filtering the data frame in accordance with at least one of the identifier (ID), the data, and a CAN channel.

11. A CAN (controller area network) controller comprising:
   a memory allocation unit implemented as an integrated circuit and configured;
      to dynamically allocate a message buffer (MB) within a memory, the MB for queuing, upon reception, a data frame comprising an identifier (ID) and data, with MB allocation occurring after reception of the data and MB de-allocation occurring once the data is retrieved from the memory; and
      to provide a pointer that points to the MB, where the pointer is accessed via a static location in the memory;
   a memory access controller coupled to the memory allocation unit and the memory and configured to control access to the memory to facilitate transmitting and receiving a multiplicity of data frames over a CAN bus; and
   a CPU interface coupled to a host, wherein the host is provided access to the MB in one or more of a polling mode of operation and an interrupt driven mode of operation.

12. The CAN controller of claim 11 further comprising a receive engine for receiving the data frame comprising an identifier (ID) and data and for causing the memory allocation unit to dynamically allocate the MB and assign the static location in the memory.

13. The CAN controller of claim 12 further comprising a message filtering unit coupled to the CAN bus and configured for filtering the data frame in accordance with filtering criteria and wherein assigning the static location and dynamically allocating the MB is responsive to the data frame satisfying the filtering criteria.

14. The CAN controller of claim 12 wherein the receive engine receives a plurality of data frames and the memory allocation unit dynamically allocates a corresponding plurality of MBs with the pointer placed in the static location in memory and a next pointer placed in the MB and pointing to a next allocated MB, thereby building a linked list of MBs in the order that the plurality of data frames was received.

15. The CAN controller of claim 14 wherein a message filtering unit is coupled to the CAN bus and configured for filtering the plurality of data frames in accordance with a first filtering criteria and in accordance with a second filtering criteria and where a first linked list of MBs is formed from a first portion of the plurality of data frames that satisfy the first filtering criteria and a second linked list of MBs is formed from a second portion of the plurality of data frames that satisfy the second filtering criteria.

16. The CAN controller of claim 12 wherein the CPU interface is further configured to be coupled to the memory access controller and memory allocation unit and collectively configured to provide the host with read access to the MB via the pointer wherein after the MB has been read by the host it is de-allocated by the memory allocation unit, thereby allowing reuse of the memory associated with the MB.

17. The CAN controller of claim 16 wherein the CPU interface provides an interrupt to the host and the host is then provided access to the MB in the interrupt driven mode of operation.

18. A host interface for a controller area network (CAN) controller, the host interface implemented in integrated circuit (IC) circuitry and configured to be coupled to a host and to a CAN Bus interface, the host interface comprising:
   a memory allocation unit for dynamically allocating message buffers (MBs) for queuing data frames in one or more linked list of MBs,
      wherein a particular MB is allocated only upon receipt of valid data, the particular MB is used for queuing the valid data, and the particular MB is de-allocated once the valid data is retrieved, and
      wherein for each linked list of MBs a first pointer to a first MB is stored is a predetermined memory location, a second pointer to a second MB is stored in the first MB, and subsequent pointers to subsequent MBs are stored in the respective immediately preceding MBs;
   a receive engine coupled to the CAN bus interface for receiving data frames from the CAN bus and storing received data frames in the one or more linked list of MBs of type receive;
   a transmit engine coupled to the CAN bus interface for transmitting transmit data frames stored in the one or more linked list of MBs of type transmit; and
   a memory access controller for controlling access by the receive engine, transmit engine, and the host to the one or more linked list of MBs,
      wherein the host is provided access to the one or more linked list of MBs in one or more of a polling mode of operation and an interrupt driven mode of operation.

19. The host interface of claim 18 further comprising a message filter unit coupled to the CAN bus interface for filtering received data frames in accordance with filtering criteria, wherein the received data frames that satisfy a first filtering criteria are stored in a first linked list of MBs and the received data frames that satisfy a second filtering criteria are stored in a second linked list of MBs.

20. The host interface of claim 18 collectively configured with the memory access controller and memory allocation unit provide the host with read access to the one or more linked list of MBs wherein after the MB has been read by the host it is de-allocated by the memory allocation unit, thereby allowing reuse of the memory associated with the MB.

* * * * *